(12) United States Patent
Albertelli et al.

(10) Patent No.: US 8,590,265 B2
(45) Date of Patent: Nov. 26, 2013

(54) PRECURSOR FOR A DOOR

(75) Inventors: Aldino Albertelli, London (GB); Colin Nigel Pearce, Surrey (GB)

(73) Assignee: Acell Industries Limited, Cork, County Cork (IE)

( * ) Notice: Subject to any disclaimer, the term of this patent is extended or adjusted under 35 U.S.C. 154(b) by 965 days.

(21) Appl. No.: 10/557,834

(22) PCT Filed: May 24, 2004

(86) PCT No.: PCT/GB2004/002221
§ 371 (c)(1),
(2), (4) Date: Aug. 23, 2006

(87) PCT Pub. No.: WO2004/104347
PCT Pub. Date: Dec. 2, 2004

(65) Prior Publication Data
US 2007/0113407 A1 May 24, 2007

(30) Foreign Application Priority Data
May 23, 2003 (GB) .................................. 0311967.4

(51) Int. Cl.
*E04C 1/00* (2006.01)
(52) U.S. Cl.
USPC .................... 52/745.19; 52/745.18; 52/309.4; 52/309.14; 52/784.1; 52/783.1; 52/796.1; 52/455
(58) Field of Classification Search
USPC ........ 52/309.3–309.6, 309.8, 309.11, 309.14, 52/309.15, 455–458, 783.1, 783.11, 52/783.12, 783.14, 784.12, 784.14, 793.1, 52/794.1, 796.1, 741.1, 745.19, 741.13, 52/745.05, 745.15, 745.16, 747.1; 156/78, 156/292, 153, 256, 257, 60, 77, 62; 428/304.4, 317.1, 40.1–42.3
See application file for complete search history.

(56) References Cited

U.S. PATENT DOCUMENTS

| | | | | |
|---|---|---|---|---|
| 3,615,969 A | * | 10/1971 | Hegg | 156/78 |
| 3,976,526 A | * | 8/1976 | Hovey et al. | 156/212 |
| 4,054,477 A | * | 10/1977 | Curran | 156/197 |
| 4,078,959 A | * | 3/1978 | Palfey et al. | 156/214 |
| 4,294,055 A | | 10/1981 | Andresen | |
| 4,312,908 A | * | 1/1982 | Jasperson | 428/214 |
| 4,343,669 A | * | 8/1982 | Prior | 156/212 |
| 5,080,950 A | | 1/1992 | Burke | |
| 5,082,716 A | | 1/1992 | Satterfield et al. | |
| 5,224,315 A | * | 7/1993 | Winter, IV | 52/309.8 |
| 5,373,674 A | * | 12/1994 | Winter, IV | 52/309.9 |
| 5,950,382 A | * | 9/1999 | Martino | 52/311.1 |
| 6,030,483 A | * | 2/2000 | Wilson | 156/292 |
| 6,080,495 A | * | 6/2000 | Wright | 428/623 |

(Continued)

FOREIGN PATENT DOCUMENTS

DE 3723924 A1 3/1988
DE 296 16 671 U 10/1997

(Continued)

*Primary Examiner* — Jeanette Chapman
(74) *Attorney, Agent, or Firm* — Hodgson Russ LLP

(57) ABSTRACT

A method comprises a) attaching a first skin to a first surface of an open cell foam to form a precursor for a door, window or panel; and b) attaching a second skin to the precursor in a separate step from step a). A precursor for a door, window, or panel, comprises a skin attached to one face of an open cell foam, but not to an opposing face of the open cell foam.

29 Claims, 2 Drawing Sheets

(56) References Cited

U.S. PATENT DOCUMENTS

| | | |
|---|---|---|
| 6,253,530 B1 | 7/2001 | Price et al. |
| 6,389,769 B1 * | 5/2002 | McKinney et al. .......... 52/309.9 |
| 6,401,414 B1 * | 6/2002 | Steel et al. .................. 52/309.6 |
| 6,665,997 B2 * | 12/2003 | Chen .......................... 52/800.12 |
| 6,679,969 B1 * | 1/2004 | Fournier et al. ............... 156/245 |
| 6,706,370 B1 * | 3/2004 | Ito et al. ........................ 428/174 |
| 6,824,851 B1 * | 11/2004 | Locher et al. ................... 428/76 |
| 7,048,986 B2 * | 5/2006 | Shah et al. ..................... 428/117 |
| 8,012,889 B2 * | 9/2011 | Balthes et al. ................. 442/136 |
| 2001/0001687 A1 * | 5/2001 | Pokorzynski et al. ..... 428/318.6 |
| 2002/0108337 A1 * | 8/2002 | Clarke et al. ................ 52/309.9 |
| 2003/0200714 A1 * | 10/2003 | Minke et al. .................... 52/423 |

FOREIGN PATENT DOCUMENTS

| | | |
|---|---|---|
| EP | 0694426 A2 | 1/1996 |
| GB | 1296053 A * | 11/1972 |
| GB | 1439191 | 6/1976 |
| IE | 75071 B3 * | 8/1997 |
| WO | 95/12496 | 5/1995 |
| WO | 99/35364 | 7/1999 |
| WO | 00/36236 | 6/2000 |
| WO | 02/096623 A1 | 12/2002 |

* cited by examiner

PRECURSOR FOR A DOOR

BACKGROUND OF THE INVENTION

The present invention relates to synthetic doors, windows and panels, to methods of making them and to precursors therefor.

Doors, windows and panels have traditionally been made from wood, which may be glazed or unglazed. However, unless specially treated, wood can warp if exposed to changes in temperature and/or humidity. This can be disadvantageous aesthetically and can also lead to difficulties in opening and closing the doors, windows and partitions. The latter are particular problems in the light of modern building safety regulations, where warped doors, windows and panels can constitute a fire hazard. Furthermore, wood can be relatively expensive to obtain and there are major environmental concerns in respect of the use of certain types of wood.

Over the last few decades there has therefore been a trend towards providing artificial doors, panels and windows. One type of artificial door is a moulded door. Moulded doors can be formed by a number of different methods.

In one method two preformed skins are provided by vacuum forming in complementarily shaped moulds and are then secured to opposite sides of a frame, prior to injecting a foam into a cavity located between the skins. The foam acts as a filler and can assist in providing increased improved rigidity and insulation the door. The door can then be removed from the press and finished as appropriate.

However, although this method can be effective, it is not always reliable. This is because the curing of foam and the filling of the cavity is difficult to control accurately. Furthermore, the rheological properties of the curing foam can be adversely affected by wire mesh reinforcements, which are often provided between the skins in order to strengthen the resultant product.

Another method is to provide a preformed foam, which may be held within a frame, and to adhere first and second skins to opposing faces of the foam and/or frame. This is generally achieved by first forming a "sandwich" comprising the skins as outer layers and the foam (optionally within a frame) as an inner layer with adhesive applied to inner surfaces of the skins and then applying heat and pressure so that the components are laminated together.

In both of the foregoing methods two skins are generally provided from a moulding company and then assembled into a door, window or panel in a workshop by a different company. Following lamination in the workshop a finishing process is required, which requires skilled labour. For example the door, window or panel comprising the two skins and foam interior may be shaped, trimmed, routed, drilled, or painted; one or more glazing panels, handles, locks, etc. may be added; or it may be prepared to receive such articles (e.g. by drilling appropriate holes, cutting out recesses/apertures, planing, etc.)

SUMMARY OF THE INVENTION

The present invention represents a radical departure from such procedures. It provides a precursor in the form of a single skin that is already attached to a foam, preferably an open cell foam.

One aspect of the present invention is a method comprising:

a) attaching a first skin to a first surface of a foam, preferably an open cell foam to provide a precursor for a door, window or panel; and b) attaching a second skin to the precursor in a separate step from step a).

Because steps a) and b) are separate, the precursor can be shaped or otherwise processed, prior to being supplied to a workshop and attached to the second skin which may, in accordance with a preferred aspect of this invention, be attached to foam as a second precursor. Much of the finishing of the article can therefore be achieved before the article is actually received by the workshop.

This provides significant advantages in that the article can be assembled in the workshop much more rapidly than was previously the case. This greatly reduces the need for skilled labour in the workshop and can also greatly increase the turnover rate of finished articles.

The precursor may optionally include reinforcing means, which may be provided within the open cell foam or elsewhere (e.g. adjacent to the open cell foam). The reinforcement means may for example be a mesh, such as a wire mesh. Furthermore, the precursor may also optionally include means, such as an alarm system, such that the resulting door, window or panel is a SMART door, window or panel. Indeed, this invention facilitates the placement of such means.

The precursor may also, or alternatively, include a frame for holding the foam in place and/or for providing rigidity, although this is not essential. Typically the frame will be a wooden frame but other rigid frames may be used (e.g. metal or plastics frames).

The precursor may be provided in a form that is already shaped, trimmed, routed, drilled, varnished, coloured, waxed or otherwise modified. For example, it may be provided with one or more apertures or recesses.

It may therefore be adapted to receive (or may already include) one or more pieces of glazing and/fittings, prior to being attached to the second skin or precursor. Typical fittings include a handle, a lock, a plate, a catch and/or a hinge.

It is envisaged that the workshop will frequently be at a different location and owned by a different company than the manufacturer of the precursor, which company may then sell on the finished door, window or panel to private customers and/or to the trade.

There will usually be a significant period of time following manufacture of the precursor before it is attached to the second skin or precursor. This will generally be over 4 or over 12 such as 24 hours in order to allow for transportation, assembly, etc. More typically, it may, for example, be over 48 hours or over 1 week. During this time it is preferred that the precursor is stored under conditions of low humidity. For example it may be provided in a sealed package and a desiccant may be present in the package to remove any excess moisture. A precursor of the present invention when in storage represents a further aspect of the present invention.

When the door, window or panel is being made in the workshop, the precursor is removed from any packaging and the second skin or precursor is attached directly or indirectly to it. If desired, a frame and/or reinforcing means may be added at this stage.

Attachment of the second skin or precursor may, for example, be via the frame. More preferably, however, the second skin or precursor is attached to a second surface of the foam (whether or not the second skin is also attached to a frame).

Normally the first and second surfaces will be opposing major surfaces of the foam.

Desirably, an adhesive is used to attach the second skin or precursor to the precursor or first precursor, respectively, although other means may be used (e.g. thermal bonding, mechanical securing means, etc).

The adhesive may be provided on an inner surface of the second skin or precursor, which may then be placed over the foam. Pressure and/or heat may then be applied to aid in securing the second skin or precursor to the precursor or first precursor.

The precursor per se represents a further aspect of the present invention.

Thus, in addition to the method of the present invention, there is provided a precursor for a door, window, or panel, comprising a skin attached to one face of an open cell foam, but not to an opposing face of the open cell foam.

As indicated above, the precursor may include reinforcing means, a frame, one or more fittings and/or or glazing. If fittings or glazing are not provided on the precursor it may be adapted to receive them. It may be shaped, trimmed, routed, drilled, varnished, coloured, waxed or otherwise modified.

The precursor may be provided as part of a kit, or may be provided separately.

A kit of the present invention may include the precursor and a second skin that is not attached to the precursor.

It may further include one or more of: an adhesive, a reinforcement means, alarm system, a fitting, a paint, a varnish, a lacquer, a stain or a wax. Typically the kit will be provided in a protective package, which may be sealed to prevent interference/loss of components. It may optionally further include instructions for assembling components of the kit together. It may include a desiccant.

An alternative kit of the present invention comprises a first precursor and a second precursor, wherein each of the first and second precursors is a precursor of the present invention. The alternative kit may also comprise one or more of the components recited in the foregoing paragraph.

The alternative kit can be for an alternative method of the present invention.

The alternative method comprises attaching the first precursor to the second precursor. For example, an exposed foam surface of the first precursor can be attached to an exposed foam surface of the second precursor by using an adhesive, optionally under heat and pressure.

The first and/or second precursors can be modified as desired prior to being attached to one another. The foregoing discussion in respect of modification applies here mutatis mutandis. Thus, for example, one or both of the precursors may be provided already shaped, trimmed, routed, drilled, varnished, coloured, or waxed. One or both of the precursors may be adapted to receive glazing and/or a fitting, or may already comprise glazing and/or a fitting.

The various methods, precursors and kits of the present invention are all useful in producing windows, doors or panels. Thus the present invention includes within its scope windows, doors or panels produced using a precursor, kit or method of the present invention.

Having described the invention in general terms, various terminology used herein will now be discussed in greater detail.

Skin

The term "skin" is well known to those skilled in the art of forming moulded doors, windows and panels. It is used to describe a relatively thin layer that covers an inner layer of foam fibreglass or other filling material.

The skin may, for example be a vacuum formed thermoplastics material. Preferably it comprises a vinyl chloride polymer (e.g. PVC or UPVC) or GRP. The skin may be provided with a decorative surface. Thus it may comprise one or more panels, beads, coves, or other decorative features. It may be provided with a simulated wood grain surface. WO 95/12496 describes one method of producing such a surface, whereby a part of a mould is coated with at least one colorant having a colour which is different from the colour of a resin to be cured and then wiping the mould surface. This has the effect of concentrating colorant on the peaks and high points of the moulding and thus in the valleys of the resultant article to provide the simulated wood grain.

Foam

By a foam having frangible cell walls it is intended that under compression the foam crumbles by brittle fracture of the cell walls e.g. involving a clean fracture of the cell walls. Such a foam can retain a clear and substantially dimensionally accurate imprint in the crushed zone of an object through which the compressive force is applied. In general, it is preferred that the yield strength of the foam, which in this case means the minimum force required to cause the fracture of the cell walls and for the foam to crumble, is in the range of about 100 to 140 KPa (15 to 20 lbs/sq. in) more preferably at least 200 KPa (30 lbs/sq. in), since this provides useful impact resistance. In general, for a given foam composition, the greater the density, the greater the yield strength.

By using a substantially rigid plastics foam with frangible cell walls, mouldings with depressed zones of moulding detail can be readily formed by applying a vacuum formed skin to the foam core with sufficient pressure to cause the cell walls of the foam in the areas behind the depressed zones of the skin to be fractured whereby the foam is caused to conform to the contours of the skin in those zones by controlled localised crushing. Thus, air gaps between the skins can be avoided and it is not necessary to preform the core pieces in the form of complicated shapes. This is particularly advantageous since the presence of such air gaps in prior art panels has contributed to their inability to resist changes in temperature.

It is advantageous to use an open cell foam having frangible walls as pressing a skin having depressed regions into a conventional foamed core such as of polystyrene cannot be successfully achieved because the resilience of the foam will cause distortion of the skins when the pressure is released.

Any suitable plastics foam may be used provided it is substantially open-cell and rigid. However, the foam is advantageously selected to be of a high density relative to the foamed polystyrene conventionally used, e.g. a density of 75 kg/m$^3$ or above, since this gives a better feel to the panel and makes it sound and handle more like a conventional wooden panel. However, foams having lower densities may also be selected. Where a higher density is desirable, the foam may contain a filler, more preferably a finely divided inert and preferably inorganic solid. The filler may be selected such that it contributes to the panels ability to resist changes in temperature. In a particularly preferred embodiment, the filler is capable of absorbing moisture, e.g. as water of crystallisation.

It is believed that in prior arrangements where a closed cell foam is employed, such as a polystyrene foam, any solvent employed or moisture present during the bonding of the foam core to the skin tends to be trapped between the core and the skin. Any volatilization and subsequent condensation of the solvent or moisture due to localised changes in temperature, for example as a result of exposure to strong sunlight and then darkness, cause high localised pressure variations which tend to lead to localised bubbling, or failure of the bond. The effect is even more marked where high temperatures are encountered. A closed cell foam may even contribute to the "bowing" because any air or solvent trapped in the core itself will expand when the core is heated causing the panel to bow.

Without wishing to be bound by any theory, it is believed that the reduction of bowing is assisted by use of an open cell foam in the core since gas flow is possible which reduces the localised increases in pressure. As the foam is of an open cell configuration, as the gases in cells closest to the heat source expand they flow through open pathways to adjacent cells and by this means pressure is dissipated through the panel. Further, the open cell configuration reduces the rate at which heat is passed through the panel.

Any suitable foam may be used for this aspect of the invention provided it is substantially open cell; for example, a polyurethane foam. A foam that has an open-cell configuration at production is particularly suitable but a foam that also has frangible cell walls is particularly preferred where the skin includes depressed areas, such as to provide a moulding effect.

Where a foam of this type is used, the cell wall will fracture as pressure is placed on the foam by the application of the depressed areas of the skin. This localised increase in pressure will increase the pressure inside the cell, which will cause the gases to travel through the foam, and the cell to collapse thereby accommodating the depressed area of the skin.

One suitable foam is a rigid filled phenolic foam. One particularly suitable foam is that produced by effecting a curing reaction between:
(a) a liquid phenolic resole having a reactivity number (as defined below) of at least 1 and
(b) a strong acid hardener for the resole, in the presence of:
(c) a finely divided inert and insoluble particulate solid which is present in an amount of at least 5% by weight of the liquid resole and is substantially uniformly dispersed through the mixture containing resole and hardener, the temperature of the mixture containing resole and hardener due to applied heat not exceeding 85° C. and the said temperature and the concentration of the acid hardener being such that compounds generated as by-products of the curing reaction are volatilized within the mixture before the mixture sets whereby a foamed phenolic resin product is produced.

By a phenolic resole is meant a solution in a suitable solvent of the acid-curable prepolymer composition obtained by condensing, usually in the presence of an alkaline catalyst such as sodium hydroxide, at least one phenolic compound with at least one aldehyde, in well-known manner. Examples of phenols that may be employed are phenol itself and substituted, usually alkyl substituted, derivatives thereof provided that the three positions on the phenolic benzene ring o- and p- to the phenolic hydroxyl group are unsubstituted. Mixtures of such phenols may also be used. Mixtures of one or more than one of such phenols with substituted phenols in which one of the ortho or para positions has been substituted may also be employed where an improvement in the flow characteristics of the resole is required but the cured products will be less highly cross-linked. However, in general, the phenol will be comprised mainly or entirely of phenol itself, for economic reasons.

The aldehyde will generally be formaldehyde although the use of higher molecular weight aldehydes is not excluded.

The phenol/aldehyde condensation product component of the resole is suitably formed by reaction of the phenol with at least 1 mole of formaldehyde per mole of the phenol, the formaldehyde being generally provided as a solution in water, e.g. as formalin. It is preferred to use a molar ratio of formaldehyde to phenol of at least 1.25 to 1 but ratios above 2.5 to 1 are preferably avoided. The most preferred range is 1.4 to 2.0 to 1.

The mixture may also contain a compound having two active H atoms (dihydric compound) that will react with the phenol/aldehyde reaction product of the resole during the curing step to reduce the density of cross-linking. Preferred dihydric compounds are diols, especially alkylene diols or diols in which the chain of atoms between the OH groups contains not only methylene and/or alkyl-substituted methylene groups but also one or more hetero atoms, especially oxygen atoms, e.g. ethylene glycol, propylene glycol, propane-1,3-diol, butane-1,4-diol and neopentyl glycol. Particularly preferred diols are poly-, especially di-, (alkylene ether) diols e.g. diethylene glycol and, especially, dipropylene glycol. Preferably the dihydric compound is present in an amount of from 0 to 35% by weight, more preferably 0 to 25% by weight, based on the weight of phenol/aldehyde condensation product. Most preferably, the dihydric compound, when used, is present in an amount of from 5 to 15% by weight based on the weight of phenol/aldehyde condensation product. When such resoles containing dihydric compounds are employed in the present process, products having a particularly good combination of physical properties, especially strength, can be obtained.

Suitably, the dihydric compound is added to the formed resole and preferably has 2-6 atoms between OH groups.

The resole may comprise a solution of the phenol/aldehyde reaction product in water or in any other suitable solvent or in a solvent mixture, which may or may not include water. Where water is used as the sole solvent, it is preferred to be present in an amount of from 15 to 35% by weight of the resole, preferably 20 to 30%. Of course the water content may be substantially less if it is used in conjunction with a cosolvent. e.g. an alcohol or one of the above-mentioned dihydric compounds where one is used.

As indicated above, the liquid resole (i.e. the solution of phenol/aldehyde product optionally containing dihydric compound) must have a reactivity number of at least 1. The reactivity number is $10/x$ where $x$ is the time in minutes required to harden the resole using 10% by weight of the resole of a 66-67% aqueous solution of p-toluene sulfonic acid at 60° C. The test involves mixing about 5 ml of the resole with the stated amount of the p-toluene sulfonic acid solution in a test tube, immersing the test tube in a water bath heated to 60° C. and measuring the time required for the mixture to become hard to the touch. The resole should have a reactivity number of at least 1 for useful foamed products to be produced and preferably the resole has a reactivity number of at least 5, most preferably at least 10. The pH of the resole, which is generally alkaline, is preferably adjusted to about 7, if necessary, for use in the process, suitably by the addition of a weak organic acid such as lactic acid.

Examples of strong acid hardeners are inorganic acids such as hydrochloric acid, sulphuric acid and phosphoric acid, and strong organic acids such as aromatic sulphonic acids, e.g. toluene sulphonic acids, and trichloroacetic acid. Weak acids such as acetic acid and propionic acid are generally not suitable. The preferred hardeners for the process of the invention are the aromatic sulfonic acids, especially toluene sulfonic acids.

The acid may be used as a solution in a suitable solvent such as water.

When the mixture of resole, hardener and solid is to be poured, e.g. into a mould and in slush moulding applications, the amount of inert solid that can be added to the resole and hardener is determined by the viscosity of the mixture of resole and hardener in the absence of the solid. For these applications, it is preferred that the hardener is provided in a form, e.g. solution, such that when mixed with the resole in the required amount yields a liquid having an apparent viscosity not exceeding about 50 poises at the temperature at which the mixture is to be used, and the preferred range is 5-20 poises. Below 5 Poises, the amount of solvent present tends to present difficulties during the curing reaction.

The curing reaction is exothermic and will therefore of itself cause the temperature of the mixture containing resole and acid hardener to be raised. The temperature of the mixture may also be raised by applied heat but the temperature to which said mixture may then be raised (that is, excluding the effect of any exotherm) must not exceed 85° C.

If the temperature of the mixture exceeds 85° C. before addition of the hardener, it is difficult or impossible thereafter to properly disperse the hardener through the mixture because of incipient curing. On the other hand, it is difficult, if not impossible, to uniformly heat the mixture above 85° C. after addition of the hardener.

Increasing the temperature towards 85° C. tends to lead to coarseness and non-uniformity of the texture of the foam but this can be offset at least to some extent at moderate temperatures by reducing the concentration of hardener. However at temperatures much above 75° C. even the minimum amount of hardener required to cause the composition to set is generally too much to avoid these disadvantages. Thus, temperatures above 75° C. are preferably avoided and preferred temperatures for most applications are from ambient temperature to about 75° C. The preferred temperature range appears to depend to some extent on the nature of the solid (c). For most solids it is from 25 to 65° C. but for some solids, in particular wood flour and grain flour, the preferred range is 25 to 75° C. The most preferred temperature range is 30 to 50° C. Temperatures below ambient, e.g. down to 10° C. can be used, if desired, but no advantage is gained thereby. In general, at temperatures up to 75° C., increase in temperature leads to decrease in the density of the foam and vice versa.

The amount of hardener present also affects the nature of the product as well as the rate of hardening. Thus, increasing the amount of hardener not only has the effect of reducing the time required to harden the composition but above a certain level dependant on the temperature and nature of the resole it also tends to produce a less uniform cell structure. It also tends to increase the density of the foam because of the increase in the rate of hardening. In fact, if too high a concentration of hardener is used, the rate of hardening may be so rapid that no foaming occurs at all and under some conditions the reaction can become explosive because of the build up of gas inside a hardened shell of resin. The appropriate amount of hardener will depend primarily on the temperature of the mixture of resole and hardener prior to the commencement of the exothermic curing reaction and the reactivity number of the resole and will vary inversely with the chosen temperature and the reactivity number. The preferred range of hardener concentration is the equivalent of 2 to 20 parts by weight of p-toluene sulfonic acid per 100 parts by weight of phenol/aldehyde reaction product in the resole assuming that the resole has a substantially neutral reaction, i.e. a pH of about 7. By equivalent to p-toluene sulfonic acid, we mean the amount of chosen hardener required to give substantially the same setting time as the stated amount of p-toluene sulfonic acid. The most suitable amount for any given temperature and combination of resole and finely divided solid is readily determinable by simple experiment. Where the preferred temperature range is 25-75° C. and the resole has a reactivity number of at least 10, the best results are generally obtained with the use of hardener in amounts equivalent to 3 to 10 parts of p-toluene sulfonic acid per 100 parts by weight of the phenol/aldehyde reaction product For use with temperatures below 25° C. or resoles having a reactivity number below 10, it may be necessary to use more hardener.

It may be necessary to make some adjustment of the hardener composition in accordance with the nature, especially shape and size, of the mould and this can be established by experiment.

By suitable control of the temperature and of the hardener concentration, the time lapse between adding the hardener to the resole and the composition becoming hard (referred to herein as the setting time) can be varied at will from a few seconds to up to an hour or even more, without substantially affecting the density and cell structure of the product.

Another factor that controls the amount of hardener required can be the nature of the inert solid. Very few are exactly neutral and if the solid has an alkaline reaction, even if only very slight, more hardener may be required because of the tendency of the filler to neutralize it. It is therefore to be understood that the preferred values for hardener concentration given above do not take into account any such effect of the solid. Any adjustment required because of the nature of the solid will depend on the amount of solid used and can be determined by simple experiment.

The exothermic curing reaction of the resole and acid hardener leads to the formation of by-products, particularly aldehyde and water, which are at least partially volatilized.

The curing reaction is effected in the presence of a finely divided inert and insoluble particulate solid which is substantially uniformly dispersed throughout the mixture of resole and hardener. By an inert solid we mean that in the quantity it is used it does not prevent the curing reaction.

It is believed that the finely divided particulate solid provides nuclei for the gas bubbles formed by the volatilization of the small molecules, primarily $CH_2O$ and/or $H_2O$, present in the resole and/or generated by the curing action, and provides sites at which bubble formation is promoted, thereby assisting uniformity of pore size. The presence of the finely divided solid may also promote stabilization of the individual bubbles and reduce the tendency of bubbles to agglomerate and eventually cause likelihood of bubble collapse prior to cure. The phenomenon may be similar to that of froth flotation employed in the concentration of low grade ores in metallurgy. In any event, the presence of the solid is essential to the formation of the product. To achieve the desired effect, the solid should be present in an amount of not less than 5% by weight based on the weight of the resole.

Any finely divided particulate solid that is insoluble in the reaction mixture is suitable, provided it is inert. The fillers may be organic or inorganic (including metallic), and crystalline or amorphous. Even fibrous solids have been found to be effective, although not preferred. Examples include clays, clay minerals, talc, vermiculite, metal oxides, refractories, solid or hollow glass microspheres, fly ash, coal dust, wood flour, grain flour, nut shell flour, silica, mineral fibres such as finely chopped glass fibre and finely divided asbestos, chopped fibres, finely chopped natural or synthetic fibres, ground plastics and resins whether in the form of powder or fibres, e.g. reclaimed waste plastics and resins, pigments such as powdered paint and carbon black, and starches.

Solids having more than a slightly alkaline reaction, e.g. silicates and carbonates of alkali metals, are preferably avoided because of their tendency to react with the acid hardener. Solids such as talc, however, which have a very mild alkaline reaction, in some cases because of contamination with more strongly alkaline materials such as magnesite, are acceptable.

Some materials, especially fibrous materials such as wood flour, can be absorbent and it may therefore be necessary to use generally larger amounts of these materials than non-fibrous materials, to achieve valuable foamed products.

The solids preferably have a particle size in the range 0.5 to 800 microns. If the particle size is too great, the cell structure of the foam tends to become undesirably coarse. On the other hand, at very small particle sizes, the foams obtained tend to be rather dense. The preferred range is 1 to 100 microns, most preferably 2 to 40 microns. Uniformity of cell structure appears to be encouraged by uniformity of particle size. Mixtures of solids may be used if desired.

If desired, solids such as finely divided metal powders may be included which contribute to the volume of gas or vapour generated during the process. If used alone, however, it be understood that the residues they leave after the gas by decomposition or chemical reaction satisfy the requirements of the inert and insoluble finely divided particulate solid required by the process of the invention.

Preferably, the finely divided solid has a density that is not greatly different from that of the resole, so as to reduce the possibility of the finely divided solid tending to accumulate towards the bottom of the mixture after mixing.

One preferred class of solids is the hydraulic cements, e.g. gypsum and plaster, but not Portland cement because of its alkalinity. These solids will tend to react with water present in the reaction mixture to produce a hardened skeletal structure within the cured resin product. Moreover, the reaction with the water is also exothermic and assists in the foaming and curing reaction. Foamed products obtained using these materials have particularly valuable physical properties. Moreover, when exposed to flame even for long periods of time they tend to char to a brick-like consistency that is still strong and capable of supporting loads. The products also have excellent thermal insulation and energy absorption properties. The preferred amount of inert particulate solid is from 20 to 200 parts by weight per 100 parts by weight of resole.

Another class of solids that is preferred because its use yields products having properties similar to those obtained using hydraulic cements comprises talc and fly ash. The preferred amounts of these solids are also 20 to 200 parts by weight per 100 parts by weight of resole.

For the above classes of solid, the most preferred range is 50 to 150 parts per 100 parts of resole.

Thixotropic foam-forming mixtures can be obtained if a very finely divided solid such as Aerosil (finely divided silica) is included.

If a finely divided metal powder is included, electrically conducting properties can be obtained. The metal powder is preferably used in amounts of from 50 to 250 parts per 100 parts by weight of resole.

In general, the maximum amount of solid that can be employed is controlled only by the physical problem of incorporating it into the mixture and handling the mixture. In general it is desired that the mixture is pourable but even at quite high solids concentrations, when the mixture is like a dough or paste and cannot be poured, foamed products with valuable properties can be obtained.

In general, it is preferred to use the fibrous solids only in conjunction with a non-fibrous solid since otherwise the foam texture tends to be poorer.

Other additives may be included in the foam-forming mixture; e.g. surfactants, such as anionic materials e.g. sodium salts of long chain alkyl benzene sulfonic acids, non-ionic materials such as those based on poly(ethylene oxide) or copolymers thereof, and cationic materials such as long chain quaternary ammonium compounds or those based on polyacrylamides; viscosity modifiers such as alkyl cellulose especially methyl cellulose, and colorants such as dyes or pigments. Plasticizers for phenolic resins may also be included provided the curing and foaming reactions are not suppressed thereby, and polyfunctional compounds other than the dihydric compounds referred to above may be included which take part in the cross-linking reaction which occurs in curing; e.g. di- or poly-amines, di- or poly-isocyanates, di- or poly-carboxylic acids and aminoalcohols.

Polymerisable unsaturated compounds may also be included possibly together with free-radical polymerisation initiators that are activated during the curing action e.g. acrylic monomers, so-called urethane acrylates, styrene, maleic acid and derivatives thereof, and mixtures thereof.

Other resins may be included e.g. as prepolymers which are cured during the foaming and curing reaction or as powders, emulsions or dispersions. Examples are polyacetals such as polyvinyl acetals, vinyl polymers, olefin polymers, polyesters, acrylic polymers and styrene polymers, polyurethanes and prepolymers thereof and polyester prepolymers, as well as melamine resins, phenolic novolaks, etc.

Conventional blowing agents may also be included to enhance the foaming reaction, e.g. low boiling organic compounds or compounds which decompose or react to produce gases.

The foam-forming compositions may also contain dehydrators, if desired.

A preferred method of forming the foam-forming composition comprises first mixing the resole and inert filler to obtain a substantially uniform dispersion of the filler in the resole, and thereafter adding the hardener. Uniform distribution of both the filler and the hardener throughout the composition is essential for the production of uniformly textured foam products and therefore thorough mixing is required.

If it is desired that the composition is at elevated temperature prior to commencement of the exothermic reaction, this can be achieved by heating the resole or first mixing the resole and the solid and then heating the mixture. Preferably the solid is added to the resole just before the addition of the hardener. Alternatively, the mixture of resole, solid and hardener may be prepared and the whole mixture then heated, e.g. by short wave irradiation, preferably after it has been charged to a mould. A conventional radiant heat oven may also be used, if desired, but it is difficult to achieve uniform heating of the mixture by this means.

Preferably, the foam has a density in the range 75 to 500 $kg/m^3$, more preferably 100 to 400 $kg/m^3$ and most preferably 100 to 250 $kg/m^3$. Foam cell size is also important because up to a limit the larger the size of the cell for a given density, the thicker will be the walls and hence the greater the physical strength of the foam. However if the cell size is too large, the strength begins to suffer. Preferably, the cell size is in the range of 1 to 3 mm.

Adhesive

Any suitable adhesive may be used for bonding a skin to the foam core, including moisture-curing polyurethanes, two-pack polyurethanes, solvent based adhesives and, preferably, unsaturated polyester-based adhesives. Provided an open-cell foam is employed, excess solvent or moisture is not a problem as it can be absorbed into the foam.

Frame

To give improved rigidity, in the finished product (door, window or panel), in general the skins will be spaced not only by a foam core but also by a frame or frame members such as stiles, rails, and/or mullions. The frame members may be of wood, metal (for example, aluminium) or plastics (such as UPVC) or a combination of these, e.g. metal-reinforced plastics. The plastics material may contain filler, if desired, to improve hardness and/or rigidity.

In a preferred embodiment, the foam core occupies substantially the entire volume or volumes within the frame; i.e.

substantially the whole space within the panel defined by the skins and the components of the frame. It is also preferred that the foam is bonded to each skin over substantially the entire area of the foam core which is in contact with that skin, even when the skin includes one or more depressed zones, since this enhances the overall strength of the panel and the resistance to bowing.

In one preferred embodiment, the core of rigid plastics foam is in the form of one or more rectangular blocks of said foam held in a frame, at least one of the skins includes one or more depressed zones and the portion of the block or blocks behind each said zone conforms to the contours of said zone as a result of selective controlled crushing of the foam in the area behind said zone.

Door, Window and Panel

The terms "door", "window" and "panel" as used herein include not only completed doors and windows, but also include doors, windows and panels that are in the form of frames, prior to the addition of glazing. The terms "window and "door" are well understood. The term "panel" is used herein to include false walls, wall fascias, dividers, partitions and the like.

The doors, windows and panels may be interior or exterior. They may be in an office, industrial or domestic use. If desired, they may be provided in weather resistant and/or heat resistant form.

Glazing

The term "glazing" is used herein broadly and without limitation. Thus, it covers single pane as well as double or triple glazing. The glazing material may be conventional silicate glass or toughened glass or it may be a plastics material such as polycarbonate. The glazing material may also be uncoated or coated; for example, coated with a shatter proof coating of PVB. Furthermore, the glass may be coated to be (at least partially) reflective; may be coloured or clear; and may be transparent or translucent.

Glazing can be fitted by any appropriate method. For example, it may be fitted by the process described in WO 02/0966263 (the contents of which are incorporated herein by reference). WO 02/0966263 describes a process, whereby a foam core is provided with a continuous groove in register with the intended position of glazing and extending along at least three sides of an area to be glazed. The groove is then lined with a layer of synthetic polymer that is at least partially contiguous with a skin. A former is inserted into the groove and the door, window or panel is moulded under heat and pressure to bond the layer of synthetic polymer to the skin, whereby a continuous integral skin of synthetic polymer is formed about the at least three sides of the area to be glazed.

BRIEF DESCRIPTION OF THE DRAWINGS

The present invention will now be described by way of example only with reference to the accompanying drawings, wherein.

The figures will now be described in greater detail.

DETAILED DESCRIPTION OF THE INVENTION

Figure 1:
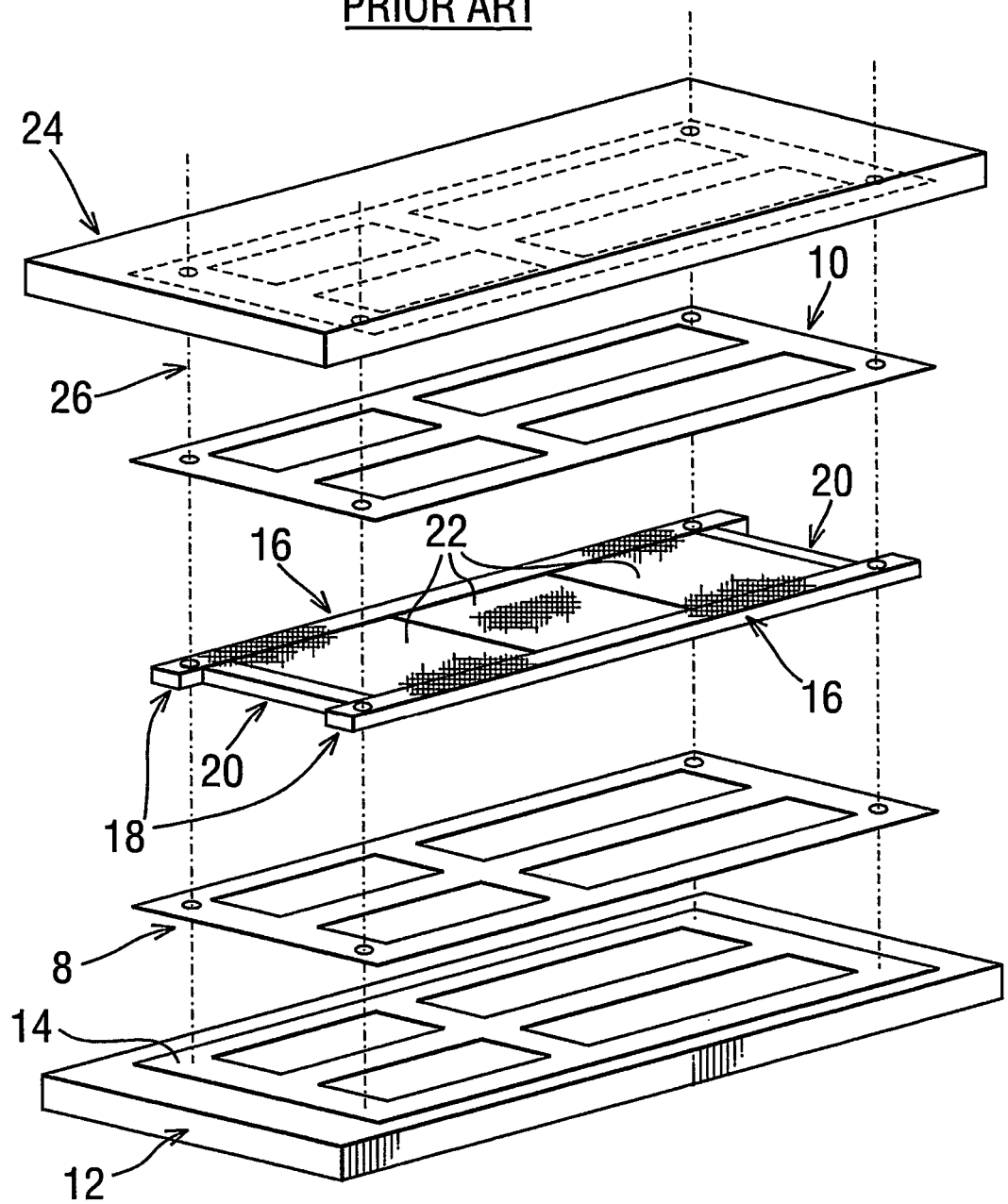
FIG. 1 illustrates a prior art method for forming a door in which a single step is used to laminate together a first skin, an open cell foam contained within a frame and a second skin. This figure is taken from WO99/35364, which discloses a method of providing a weather resistant panel comprising forming a laminate of an open-cell rigid foam core and first and seconds skins that are adhesively bonded to the core. The contents of WO99/35364 are incorporated herein by reference.

Turning to FIG. 1, a door in accordance with the prior art method is formed by first forming the skins. Using a suitable mould panel, skins 8, 10 are vacuum formed in known manner from uPVC sheets to resemble the faces of a conventional six panel door with a wood grain effect moulded into the face which is to provide the outer surface of the skin. The sheets may be self-coloured in a yellowy brown hue similar to oak.

One of the skins 8 is placed face down on the platen 12 of a press, the platen having located thereon a mould jig 14 which matches the contours of the moulding, and a suitable adhesive, preferably an unsaturated polyester-based adhesive, is applied to the upturned face, which is the rear face, of the sheet.

In a separate operation, not illustrated, the components of a softwood frame 16 comprising a pair of vertical stiles 18 and two or three horizontal rails 20 are located on a support surface and rectangular blocks 22 cut from a pre-formed slab of open cell foam, such as filled phenolic foam sold under the trade name ACELL by Acell Holdings Limited of appropriate dimensions are fitted to substantially fill the spaces between the stiles and rails, the thickness of the blocks being substantially the same as that of the stiles and rails, and the lengths and widths of the blocks being such that they just fill the spaces between the stiles and rails. The whole is then bonded together using a suitable adhesive.

This preformed assembly is positioned on the adhesive-coated upturned face of the vacuum-formed skin 8.

With the other vacuum formed skin 10 placed face down, its upper, or rear face, is coated with the adhesive and the skin is then turned over and located, with the adhesive-coated rear face facing downwards, on top of the assembly of stiles, rails (which together form the frame) and blocks of the open cell foam. The top platen 24 of the press, which carries a mould jig 26 that matches the contours of the moulding on the skin 10, is then lowered on to the assembly and pressure is applied.

The pressure is such as to cause the foam blocks to be crushed locally between the depressed zones of the vacuum formed sheets as these areas are forced into the foam, whereby the assembly of blocks 22 and frame members 18,20 is firmly held between and in contact with the two skins. At the same time, some of the adhesive coated on the face of each of the vacuum formed skins is forced into the surface layers of the blocks. The pressure is maintained until the adhesive has cured and set and the skins, blocks and frame members are securely bonded together. Suitable pressures are of the order of 0.5 to 30 kg/cm$^2$ but it will be understood that as the depressed zones of the skins are the first to come into contact with the foam blocks, the pressures applied locally in the depressed zones and which cause localised crushing of the foam are much higher, perhaps of the order of 5 to 100 kg/cm$^2$ or more. Therefore foams may be used which are crush resistant up to this level of pressure, thereby considerably enhancing the impact resistance of the panels.

If desired, several panels may be laminated at the same time by placing the assemblies one above the other in the press.

Preferably, the assemblies are located within frames during pressing to prevent any distortion in a plane perpendicular to the direction of pressure.

After removal of the panel from the press, its surface finish may be improved by applying a stain of different colour to the sheet and then removing the stain from the high points, e.g. by wiping, so that it is left substantially only in ingrained areas.

Other finishing steps may be employed e.g. trimming, cutting, drilling, adding fixtures, glazing etc, as is well known in the art.

The resultant panel bears an excellent resemblance to a conventional wooden panel with close reproduction of the contours of the paneling and a realistic grain effect. Despite the open-cell nature of the foam, its insulation properties are about the same as those of a conventional PVC panel with a polystyrene foam core. Because a rigid foam is used and the foam can substantially completely fill all the voids between the frame members, the panel is strong and resistant to warping and its impact strength is greater than that of conventional PVC panels with a polystyrene foam core. The percolation of the adhesive into the surface layers of the foam ensures an improved bond between the core and the skins, thereby reducing risk of delamination. Absorption of any trapped moisture or solvent into the open-cell foam reduces the risk of localised build-up of pressure and concomitant bubbling or failure of the adhesive bond.

The use of a filled phenolic foam such as the foam available from Acell Holdings Limited in the core endows the panel not only with a substantial resistance to distortion, especially bowing, when exposed to temperature changes but also with a very desirable combination of flame resistance, heat and sound insulation, impact strength, rigidity and resistance to flexure.

Figure 2:
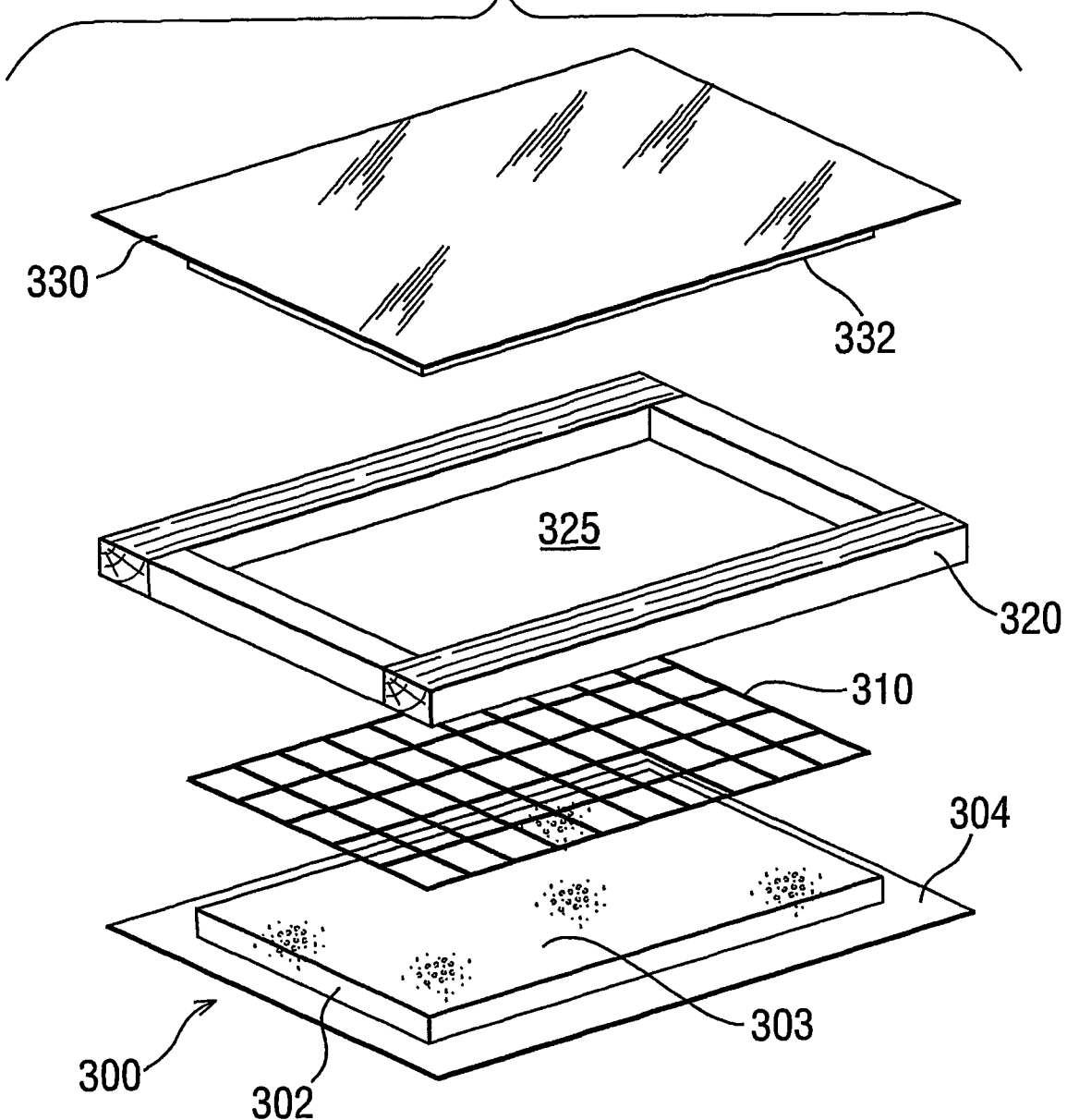
FIG. 2 illustrates the present invention in which the precursors are fabricated into a reinforced door.

Referring now to FIG. 2, a method of the present invention is illustrated in which a first and second precursor are bonded, together with a frame and reinforcement means, to form a door. First precursor 300, reinforcing mesh 310, wooden frame 320 and second precursor 330 are shown prior to being adhesively secured together using a press (not shown). Precursor 300 comprises open cell foam 302 adhered to first skin 304. A major face 303 of the open cell foam 302 is shown exposed. Mesh 310 is placed over the major exposed face 303 of foam 302. Wooden frame 320 defines an aperture 325 allowing the frame 320 to be snugly fit around the foam 302, with mesh 310 sitting on top of the foam 302. Second precursor 330 can then be placed over the mesh 310, foam 302 and frame 320 with its adhered foam 332 also a snug fit in frame 320. It has a layer of adhesive on its lower surface (not shown).

When the components are stacked as described above, they can be compressed in a press, which may also be heated to aid in forming a laminate structure. The adhesive present on the lower surface of the foam 332 of the second precursor 330 contacts the foam 302, mesh 310 and frame 320, thereby allowing a strong laminate to be formed when the adhesive is cured.

The precursors 300 and 330 have previously been trimmed to shape and so that only minor finishing (if any) of the laminate described above is required. The precursors may already be coloured and have fittings or glazing attached to them, or may already be adapted to receive such fittings or glazing (not shown). They may be already provided with one or more apertures (not shown). The skins may be of different colour and/or design, as required.

The first and second precursors may be provided to the workshop in modified form, as discussed herein, so that, as discussed herein, little (if any) skilled workmanship is needed in the workshop once the laminated article is removed from the press.

In summary, this invention provides a precursor for a moulded door window or panel is formed by attaching a first skin to a first surface of an open cell foam. A second skin can then be attached to the precursor in a separate step, which may be performed at a different location. Alternatively, a first precursor may be attached to a second precursor. The precursors enable moulded doors, windows and panels to be finished more rapidly than was previously the case and reduce the need for skilled labour at the finishing stage.

The invention claimed is:

1. A method comprising:
   a) attaching a first skin to a first surface of an open cell foam to form a precursor for a door, window or panel; and
   b) attaching a second skin to the precursor in a separate step from step a),
   wherein prior to attaching the second skin to the precursor, the precursor is modified,
   wherein the second skin is attached to the precursor at a different location from the location at which the first skin is attached to the precursor,
   wherein, prior to attaching the second skin to the precursor, the precursor is shaped, trimmed, routed, drilled, varnished, coloured, or waxed.

2. A method according to claim 1 wherein the second skin is attached to a second surface of the foam, the second being an opposing surface to the first surface.

3. A method according to claim 1, wherein an adhesive is used to attach the second skin to the precursor.

4. A method according to claim 1, wherein, prior to attaching the second skin to the precursor, the precursor is adapted to receive one or more pieces of glazing.

5. A method according to claim 1, wherein, prior to attaching the second skin to the precursor, the precursor is adapted to receive one or more fittings for the door, window, or panel.

6. A method according to claim 5, wherein the one or more fittings are selected from the group consisting of: a handle, a lock, a plate, a catch and a hinge.

7. A method according to claim 1, wherein step b) is performed at least one hour after step a).

8. A method according to claim 1, wherein step b) is performed at least 24 hours after step a).

9. A kit, for use in a method according to claim 1, comprising a precursor comprising a skin attached to one face of an open cell foam, but not to an opposing face of the open cell foam, and a second skin that is not attached to the precursor, wherein the second skin comprises a preformed plastics element.

10. A kit, for use in a method according to claim 1, comprising a first precursor and a second precursor, wherein each of the first and second precursors comprises a skin attached to one face of an open cell foam, but not to an opposing face of the open cell foam.

11. A kit according to claim 9, further comprising one or more of:
   a) an adhesive,
   b) a reinforcement means,
   c) glazing,
   d) a door, window or panel fitting, and
   e) a paint, varnish, lacquer, stain or wax.

12. A door, window or panel, formed from a method according to claim 1, which includes a foam core which includes in the interior of the foam, a layer of adhesive generally in the plane of the door, window or panel, and which comprises a first precursor adhered to a second precursor, wherein the precursors comprise a skin attached to one face of an open cell foam, but not to an opposing face of the open cell foam.

13. A method of forming a door, window or panel, which method comprises:
   a1) attaching a first skin to a first surface of an open cell foam to form a first precursor for a door, window or panel, which precursor has an exposed foam surface;

a2) attaching a second skin to a first surface of an open cell foam to form a second precursor for a door, window or panel, which precursor has an exposed foam surface; and b) attaching the exposed foam surface of the first precursor to the exposed foam surface of the second precursor to form a door, window or panel.

14. A method according to claim 13, wherein an adhesive is used to attach the second precursor to the first precursor.

15. A method according to claim 13, wherein prior to attaching the second precursor to the first precursor, the first precursor is modified.

16. A method according to claim 15, wherein, prior to attaching the second skin to the precursor, the precursor is shaped, trimmed, routed, drilled, varnished, coloured, or waxed.

17. A method according to claim 15, wherein, prior to attaching the second skin to the precursor, the precursor is adapted to receive one or more pieces of glazing.

18. A method according to claim 15, wherein, prior to attaching the second skin to the precursor, the precursor is adapted to receive one or more fittings for the door, window, or panel.

19. A method according to claim 18, wherein the one or more fittings are selected from the group consisting of: a handle, a lock, a plate, a catch and a hinge.

20. A method according to claim 13, wherein step b) is effected in a separate step after steps a).

21. A method according to claim 13, wherein step b) is performed at least one hour after steps a).

22. A method according to claim 21, wherein step b) is performed at least 24 hours after steps a).

23. A method according to claim 13, wherein the second skin is attached to the precursor at a different location from the location at which the first skin is attached to the second skin.

24. A method according to claim 13, wherein at least one of the precursors further comprises reinforcing means.

25. A method according to claim 24, wherein the reinforcing means is a mesh.

26. A method according to claim 13, at least one of the precursors further comprising a frame.

27. A method according to claim 26, wherein the frame is a wooden frame.

28. A kit according to claim 10, further comprising one or more of:
a) an adhesive,
b) a reinforcement means,
c) glazing,
d) a door, window or panel fitting, and
e) a paint, varnish, lacquer, stain or wax.

29. A method comprising:
a) attaching a first skin to a first surface of an open cell foam to form a precursor for a door, window or panel; and
b) attaching a second skin to the precursor in a separate step from step a),
wherein prior to attaching the second skin to the precursor, the precursor is modified,
wherein the second skin is attached to the precursor at a different location from the location at which the first skin is attached to the precursor,
wherein step b) is performed at least one hour after step a).

* * * * *

UNITED STATES PATENT AND TRADEMARK OFFICE
CERTIFICATE OF CORRECTION

PATENT NO. : 8,590,265 B2  Page 1 of 1
APPLICATION NO. : 10/557834
DATED : November 26, 2013
INVENTOR(S) : Albertelli et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1367 days.

Signed and Sealed this
Twenty-second Day of September, 2015

Michelle K. Lee
*Director of the United States Patent and Trademark Office*